(12) United States Patent
Chai

(10) Patent No.: US 10,033,881 B2
(45) Date of Patent: Jul. 24, 2018

(54) CHARGING SESSION MANAGEMENT METHOD AND APPARATUS

(71) Applicant: Huawei Technologies Co., Ltd., Shenzhen (CN)

(72) Inventor: Xiaoqian Chai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/257,512

(22) Filed: Sep. 6, 2016

(65) Prior Publication Data

US 2016/0373589 A1    Dec. 22, 2016

Related U.S. Application Data

(63) Continuation of application No. PCT/CN2014/072857, filed on Mar. 4, 2014.

(51) Int. Cl.
*H04M 11/00* (2006.01)
*H04M 15/00* (2006.01)
(Continued)

(52) U.S. Cl.
CPC ........ *H04M 15/66* (2013.01); *H04L 12/1407* (2013.01); *H04M 15/64* (2013.01);
(Continued)

(58) Field of Classification Search
CPC ...... H04M 15/66; H04M 15/64; H04M 11/00; H04L 12/1407; H04L 12/1439;
(Continued)

(56) References Cited

U.S. PATENT DOCUMENTS

| 2007/0156413 A1* | 7/2007 | Cai ............... G06Q 40/00 709/227 |
| 2008/0046573 A1* | 2/2008 | Ropolyi ........... H04L 12/14 709/227 |

(Continued)

FOREIGN PATENT DOCUMENTS

| CN | 103582171 A | 2/2014 |
| EP | 2112780 A1 | 10/2009 |

(Continued)

OTHER PUBLICATIONS

"3rd Generation Partnership Project; Technical Specification Group Services and System Aspects; Policy and charging control architecture (Release 12)," 3GPP TS 23.203, V.12.3.0, Technical Specification, Dec. 2013, 215 pages.

(Continued)

*Primary Examiner* — Mong-Thuy Tran
(74) *Attorney, Agent, or Firm* — Conley Rose, P.C.

(57) ABSTRACT

The present disclosure relates to the field of mobile communications, and more specifically, to a charging session management method and apparatus. The present disclosure provides a charging session management method, where when user equipment (UE) is in a state of accessing to a network, there is an internet protocol (IP)-Connectivity access network (CAN) bearer between a Gateway and the UE, where the IP-CAN bearer is used to transmit a data flow of the UE, and a charging session exists between the Gateway and a charging system; and the method includes: when a charging session established for the IP-CAN bearer exists between the Gateway and the charging system, terminating, by the Gateway, the charging session if determining that no data flow is transmitted on the IP-CAN bearer within a time threshold; and establishing, a new charging session for the IP-CAN bearer when detecting that a data (Continued)

flow transmission starts to be transmitted on the IP-CAN bearer.

19 Claims, 10 Drawing Sheets

(51) Int. Cl.
*H04L 12/14* (2006.01)
*H04W 24/08* (2009.01)
*H04W 88/16* (2009.01)
*H04W 76/30* (2018.01)

(52) U.S. Cl.
CPC ...... *H04L 12/1439* (2013.01); *H04L 12/1467* (2013.01); *H04M 11/00* (2013.01); *H04W 24/08* (2013.01); *H04W 76/30* (2018.02); *H04W 88/16* (2013.01)

(58) Field of Classification Search
CPC .. H04L 12/1467; H04W 24/08; H04W 76/06; H04W 88/16; H04W 76/30
USPC .......................................................... 455/406
See application file for complete search history.

(56) References Cited

U.S. PATENT DOCUMENTS

| | | | |
|---|---|---|---|
| 2009/0182883 A1 | 7/2009 | Giaretta et al. | |
| 2009/0264097 A1* | 10/2009 | Cai | G06Q 30/04 455/406 |
| 2009/0305684 A1* | 12/2009 | Jones | H04L 63/20 455/418 |
| 2010/0185488 A1* | 7/2010 | Hogan | H04L 12/14 705/30 |
| 2011/0010312 A1* | 1/2011 | McDonald | G06Q 30/0283 705/400 |
| 2011/0026466 A1* | 2/2011 | Zhou | H04L 12/14 370/328 |
| 2011/0066530 A1 | 3/2011 | Cai et al. | |
| 2011/0067085 A1* | 3/2011 | Brouard | H04L 12/14 726/1 |
| 2011/0208628 A1* | 8/2011 | Foottit | G06Q 10/00 705/34 |
| 2012/0276867 A1* | 11/2012 | McNamee | H04L 12/1407 455/406 |
| 2013/0091281 A1* | 4/2013 | Chai | H04L 12/14 709/225 |
| 2014/0056182 A1* | 2/2014 | Chai | H04L 12/14 370/259 |
| 2014/0161072 A1 | 6/2014 | Przybysz et al. | |
| 2014/0344472 A1* | 11/2014 | Lovsen | H04L 47/72 709/232 |
| 2015/0207940 A1* | 7/2015 | Li | H04L 65/1016 370/259 |
| 2015/0341851 A1* | 11/2015 | Cai | H04W 4/08 455/434 |

FOREIGN PATENT DOCUMENTS

| | | |
|---|---|---|
| JP | 2011504311 A | 2/2011 |
| JP | 2011514029 A | 4/2011 |
| JP | 2011523824 A | 8/2011 |
| JP | 2015526041 A | 9/2015 |
| WO | 2010051853 A1 | 5/2010 |
| WO | 2014016676 A1 | 1/2014 |

OTHER PUBLICATIONS

"3rd Generation Partnership Project; Technical Specification Group Services and System Aspects; Telecommunication management; Packet Switched (PS) domain charging (Release 8)," 3GPP TS 32.251, V8.15.0, Technical Specification, Dec. 2013, 75 pages.

Foreign Communication From a Counterpart Application, European Application No. 14884846.8, Extended European Search Report dated Jan. 24, 2017, 6 pages.

Foreign Communication From a Counterpart Application, PCT Application No. PCT/CN2014/072857, English Translation of International Search Report dated Dec. 2, 2014, 2 pages.

Foreign Communication From a Counterpart Application, PCT Application No. PCT/CN2014/072857, English Translation of Written Opinion dated Dec. 2, 2014, 23 pages.

Allot Communications et al., "Functionality of application detection and control in case of PCEF enhanced with ADC," S2-131605, SA WG2 Meeting #97, May 27-31, 2013, 45 pages.

SA WG5, "Rel-12 CRs on Charging per IP—Connectivity Access Network (IP-CAN) Session (Stage 2/3)," SP-140038, 3GPP TSG SA Meeting #63, Mar. 5-7, 2014, 6 pages.

Foreign Communication From a Counterpart Application, Japanese Application No. 2016-555586, Japanese Office Action dated Feb. 6, 2018, 12 pages.

Foreign Communication From a Counterpart Application, Japanese Application No. 2016-555586, English Translation of Japanese Office Action dated Feb. 6, 2018, 14 pages.

* cited by examiner

CHARGING SESSION MANAGEMENT METHOD AND APPARATUS

CROSS-REFERENCE TO RELATED APPLICATIONS

This application is a continuation of International Application No. PCT/CN2014/072857, filed on Mar. 4, 2014, which is hereby incorporated by reference in its entirety.

TECHNICAL FIELD

Embodiments of the present disclosure relate to the field of mobile communications, and more specifically, to a charging session management method and apparatus.

BACKGROUND

Policy and Charging control (PCC) is a policy and charging control mechanism defined by the 3rd Generation Partnership Project (3GPP). An architecture of PCC is shown in FIG. 1.

A core of the PCC mechanism is: When establishing a data flows bearer, a Gateway device requests a data flow control and charging policy from a Policy and Charging Rules Function (PCRF) entity; according to subscriber information stored in a Subscription Profile Repository (SPR), information about a bearer layer provided by the Gateway, and some local policies configured in the PCRF by an operator, the PCRF generates a dynamic charging and control policy about a service data flow or determines a to-be-activated static charging and control policy about a service data flow, and delivers a command to the Gateway to install the generated dynamic policy or activate the determined static policy that is stored in a Policy and Charging Enforcement Function (PCEF); and the Gateway performs resource allocation, data flow control, and charging control according to the installed/activated policy. The mechanism can implement precise control over a service data flow according to an operator policy, so as to implement refined operation on bandwidth.

Related concepts are defined as follows:

The PCEF entity is located in the Gateway and is configured to execute a dynamic or static control policy. The Gateway includes an endpoint established on a bearer, such as a Gateway GPRS support node (GGSN) or a PDN Gateway (P-GW).

The PCRF entity is responsible for generation of policies of Quality of Service (QoS), bandwidth, gating control, charging, or the like when user equipment uses a service in a home network.

The SPR stores user subscription data and maps to an entity in an existing system, where the entity may be a home location register (HLR), a Home Subscriber Server, (HSS), an Online Charging System (OCS), or the like.

A Traffic Detection Function (TDF) unit is configured to detect an application. Detection herein does not refer to parsing using a 5-tuple at a network layer, but refers to deep packet parsing.

The OCS receives a charging event and user use information that are reported by the PCEF after the PCEF is triggered.

A rating group (also referred to as Rating Group) is used to aggregate one or more services having same costs (also referred to as cost) or a same rating (also referred to as Rating) type, and is used for charging system rating.

In a long term evolution (LTE) network, a user mobile phone is always connected to a network (also referred to as Always-on). To implement Always-on, when being attached, the mobile phone establishes a default bearer (also referred to as Default Bearer), where the bearer exists at an entire stage in which the user is connected to the network.

When a mobile phone is in an Always-on mode, no matter whether a user uses a service, at least one Internet Protocol (IP)-Connectivity Access Network (CAN) Session exists. One IP-CAN Session involves session establishment on multiple interfaces such as Gy and Sd, and the session is maintained in entire IP-CAN Session duration, which causes a waste of resources of an OCS, a PCEF, or the like.

SUMMARY

To resolve a problem that resources on a network node such as an OCS and a PCEF are wasted in an existing session establishment manner, the present disclosure provides several charging session management methods and further provides implementation of a Gateway and a PCRF entity for implementing the charging session management methods, which include:

According to a first aspect, an embodiment of the present disclosure provides a charging session management method, where when user equipment (UE) is in a state of accessing to a network, there is an IP-CAN bearer between a Gateway and the UE, where the IP-CAN bearer is used to transmit a data flow of the UE, and a charging session exists between the Gateway and a charging system; and the method includes: terminating, by the Gateway, the charging session when a charging session established for the IP-CAN bearer exists between the Gateway and the charging system and if determining that no data flow is transmitted on the IP-CAN bearer within a time threshold; and establishing, by the Gateway, a new charging session for the IP-CAN bearer when detecting that a data flow transmission starts to be transmitted on the IP-CAN bearer.

In a first optional solution with reference to the first aspect, when the Gateway is to establish a first IP-CAN bearer with the UE, the method further includes: establishing, by the Gateway, the first IP-CAN bearer with the UE, and monitoring a data flow transmission status on the first IP-CAN bearer; and establishing, by the Gateway, a charging session with the charging system when detecting that a data flow transmission starts to be transmitted on the first IP-CAN bearer.

In a second optional solution with reference to the first optional solution, when the first IP-CAN bearer is to be established, the method further includes: sending, by the Gateway, a charging and control policy request to a PCRF after receiving a request for establishing the first IP-CAN bearer from the UE; receiving, by the Gateway, a result that is of authentication performed by an OCS on the UE and that is carried in a charging and control policy response returned by the PCRF, where the authentication performed by the OCS on the UE is completed by means of a session channel between the PCRF and the OCS; and establishing, by the Gateway, the first IP-CAN bearer when determining that the UE has been authenticated.

In a third optional solution with reference to the first aspect, if one IP-CAN session includes one or more IP-CAN bearers, and the one or more IP-CAN bearers use a charging session established for a first IP-CAN bearer, the method further includes terminating, by the Gateway, the charging session when detecting that no data flow is transmitted on the one or more IP-CAN bearers within the time threshold.

In a fourth optional solution with reference to the third optional solution, when the charging system is an OCS, the method further includes: receiving, by the Gateway, quotas that are allocated for different rating groups (RGs) in the IP-CAN Session and that are delivered by the charging system; using, by the Gateway, a quota for flows that correspond to an RG and that are on all IP-CAN Bearers in the same IP-CAN Session; collecting, by the Gateway, data flow information on different IP-CAN Bearers, and separately reporting the collected data flow information when a reporting condition is met, where the data flow information includes QoS information of the IP-CAN Bearers so that the charging system charges the data flows according to the QoS information.

According to a second aspect, an embodiment of the present disclosure provides a charging session management method, where an IP-CAN bearer has not been established between UE and a Gateway, and the method includes: receiving, by the Gateway, an IP-CAN bearer establishment request sent by the UE; establishing, by the Gateway, an IP-CAN bearer with the UE, and monitoring a data flow transmission status on the IP-CAN bearer; and when detecting that a data flow transmission starts to be transmitted on the IP-CAN bearer related to the UE, establishing, by the Gateway, a charging session with a charging system.

In a first optional solution with reference to the second aspect, when the IP-CAN bearer is to be established, the method further includes: sending, by the Gateway, a charging and control policy request to a PCRF after receiving the IP-CAN bearer establishment request from the UE; receiving, by the Gateway, a result that is of authentication performed by an OCS on the UE and that is carried in a charging and control policy response returned by the PCRF, where the authentication performed by the OCS on the UE is completed by means of a session channel between the PCRF and the OCS; and establishing, by the Gateway, the IP-CAN bearer when determining that the UE has been authenticated.

In a second optional solution with reference to the second aspect or the first optional solution, if one IP-CAN session includes one or more IP-CAN bearers, and the one or more IP-CAN bearers use a charging session established for a first IP-CAN bearer, the method further includes terminating, by the Gateway, the charging session when detecting that no data flow is transmitted on the one or more IP-CAN bearers within a time threshold.

In a third optional solution with reference to the second optional solution, when the charging system is an OCS, the method further includes: receiving, by the Gateway, quotas that are allocated for different rating groups RGs in the IP-CAN Session and that are delivered by the charging system; using, by the Gateway, a quota for flows that correspond to an RG and that are on all IP-CAN Bearers in the same IP-CAN Session; collecting, by the Gateway, data flow information on different IP-CAN Bearers, and separately reporting the collected data flow information when a reporting condition is met, where the data flow information includes QoS information of the IP-CAN Bearers so that the charging system charges the data flows according to the QoS information.

According to a third aspect, an embodiment of the present disclosure provides a charging session management method, where an IP-CAN session exists between UE and a Gateway, an Sd session needs to be established between a PCRF and a TDF for the IP-CAN session, and the PCRF delivers, based on the session, an application detection and control rule Application Detection and Control (ADC) rule; and the method includes: if the Sd session is established between the PCRF and the TDF for the IP-CAN session, after receiving a data flow transmission end event reported by the Gateway and if determining that no data flow transmission event that is in the IP-CAN session and that is reported by the Gateway is received within a time threshold, terminating, by the PCRF, the Sd session established for the IP-CAN session; and when receiving another data flow transmission event that is in the IP-CAN session and that is reported by the Gateway, establishing, by the PCRF, a new Sd session with the TDF for the IP-CAN session, so as to deliver a new ADC rule.

According to a fourth aspect, an embodiment of the present disclosure provides a charging session management method, where when UE is in a state of accessing to a network, there is an IP-CAN bearer between a Gateway and the UE, where the IP-CAN bearer is used to transmit a data flow of the UE, and a charging session exists between the Gateway and a charging system; and the method includes: receiving, by an OCS, a charging session request message sent by the Gateway; and determining a time threshold for terminating the charging session, and delivering the time threshold to the Gateway so that the Gateway monitors a session termination condition according to the time threshold, and terminates the charging session when the termination condition is met; or determining, by the OCS, a time threshold for terminating the charging session, monitoring a quota delivered for an IP-CAN bearer corresponding to the charging session, starting timing when there is no occupied quota on the IP-CAN bearer corresponding to the charging session, and when receiving no new quota request for the IP-CAN bearer corresponding to the charging session within the time threshold, delivering a request of terminating the charging session to the Gateway so that the Gateway terminates the charging session according to the session termination request.

According to a fifth aspect, an embodiment of the present disclosure provides a Gateway for implementing a charging session management method, where the Gateway includes: a processor, a data transceiver, a signaling transceiver, and a memory, which interact with each other using a bus, where the memory is configured to store code and a time threshold that are for the Gateway to perform an operation; the data transceiver is configured to transmit a data flow to UE, and is further configured to transmit the data flow to another node on a network; the signaling transceiver is configured to transmit content of a charging session to a charging system, and is further configured to transmit a charging and control policy to a PCRF; and the processor is configured to read data from the memory and complete the following functions based on the data transceiver and the signaling transceiver: when the charging session established for an IP-CAN bearer exists between the signaling transceiver and the charging system, the processor terminates the charging session if determining that no data flow is transmitted on the IP-CAN bearer within the time threshold; and the processor establishes a new charging session for the IP-CAN bearer when detecting that data flow transmission starts on the IP-CAN bearer.

According to a sixth aspect, an embodiment of the present disclosure provides a Gateway for implementing a charging session management method, where the Gateway includes: a processor, a data transceiver, a signaling transceiver, and a memory, which interact with each other using a bus, where the memory is configured to store code and a time threshold that are for the Gateway to perform an operation; the data transceiver is configured to transmit a data flow to UE, and is further configured to transmit the data flow to another node on a network; the signaling transceiver is configured to transmit content of a charging session to a charging system, and is further configured to transmit a charging and control policy to a PCRF; and the processor is configured to read data from the memory and complete the following functions based on the data transceiver and the signaling transceiver: the data transceiver receives an IP-CAN bearer establishment request sent by the UE; the processor establishes an IP-CAN bearer with the UE using the data transceiver, and monitors data flow transmission on the IP-CAN bearer; and the processor establishes the charging session between the signaling transceiver and the charging system when detecting that a data flow transmission starts to be transmitted on the IP-CAN bearer related to the UE.

According to a seventh aspect, an embodiment of the present disclosure provides a policy and charging rules function entity for implementing a charging session management method, where the policy and charging rules function entity includes: a processor, a signaling transceiver, and a memory, which interact with each other using a bus, where the memory is configured to store code for a Gateway to perform an operation; the signaling transceiver is configured to transmit signaling to a charging system, is further configured to transmit a charging and control policy to a PCEF, and is further configured to transmit content in an Sd session to a TDF; and the processor is configured to read data from the memory and complete the following functions based on the data transceiver and the signaling transceiver: if the Sd session is established between the signaling transceiver and the TDF for the IP-CAN session, after receiving a data flow transmission end event reported by the PCEF and if determining that no data flow transmission event that is in the IP-CAN session and that is reported by the Gateway is received within a time threshold, the processor terminates the Sd session established for the IP-CAN session; and when receiving, using the signaling transceiver, another data flow transmission event that is in the IP-CAN session and that is reported by the Gateway, the processor establishes a new Sd session with the TDF for the IP-CAN session, so as to deliver a new application detection and control rule ADC rule.

In the embodiments of the present disclosure, an idea in the prior art that an IP-CAN bearer and a charging session are tightly coupled is rectified, and existence of the charging session is associated with a data flow on the IP-CAN bearer. Therefore, in a case in which there is an IP-CAN bearer between UE and a Gateway but there is no data flow on the IP-CAN bear, the charging session can be terminated; and when there is another data flow on the IP-CAN bearer, a new charging session can be established. In this way, effective use of resources of a charging system and a Gateway is ensured and resources wasted for maintaining a charging session are reduced.

BRIEF DESCRIPTION OF DRAWINGS

To describe the technical solutions in the embodiments of the present disclosure more clearly, the following briefly describes the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

The term "and/or" in the present disclosure describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the embodiments of the present disclosure, to help understand implementation of the present disclosure using interfaces that have existed between network nodes, in some cases, a specific solution is described in a manner of directly replacing a Gateway with a network node PCEF.

Figure 2:
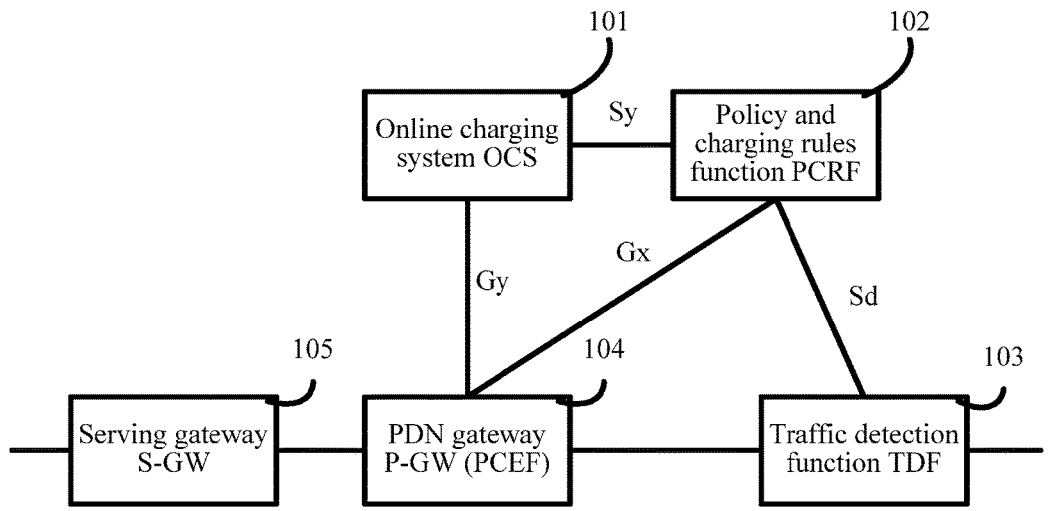
FIG. 2 is a schematic architectural diagram of charging session management according an embodiment of the present disclosure.

As shown in FIG. 2, FIG. 2 is a schematic diagram of a system framework according to an embodiment of the present disclosure. A PCRF 102 and a PCEF 104 are interconnected using a Gx interface. A session established based on the Gx interface is also referred to as a Gx session in the present disclosure. The Gx session is used to complete delivery of a control policy and a charging policy. The Gx interface is a session-level interface. A granularity of the Gx interface on an evolved packet core (EPC) is an IP-CAN session. That the Gx interface is a session-level interface and a granularity of the Gx interface on an EPC is an IP-CAN session refers to: On the EPC network, for the IP-CAN Session established between UE and a Gateway, only one Gx session is established between the PCRF and the PCEF for the IP-CAN Session; and different IP-CAN Bearers included in the IP-CAN Session complete downloading of the control and charging policy using the established Gx session. The PCEF is generally disposed in the Gateway, and on the EPC, the Gateway refers to a P-GW.

The PCRF 102 and a TDF 103 are interconnected using an Sd interface, and implement delivery of an ADC rule using a corresponding Sd session. The Sd interface is a session-level interface, which means that for the IP-CAN Session established between the UE and the Gateway (also referred to as PCEF), only one Sd session is established between the PCRF 102 and the TDF 103 for the IP-CAN Session.

Figure 1:
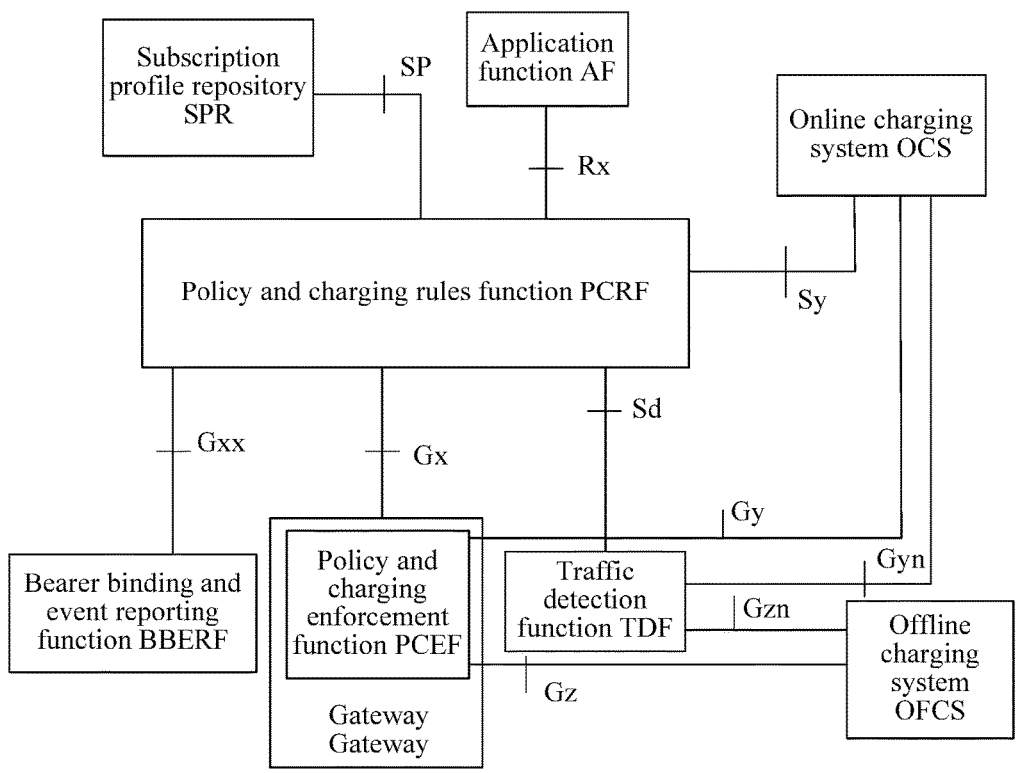
FIG. 1 is a schematic architectural diagram of a PCC in the prior art.

The PCEF 104 and a charging system are interconnected using a charging interface, where the charging interface is used by the PCEF 104 to report collected relevant use information of data flows. If the charging system is an OCS 101, the charging interface is a Gy interface. The Gy interface is further used for transferring a Credit Control (CC) message, for example, requesting for a quota (also referred to as quota). The charging interface is a bearer-level interface. When a bearer environment is the EPC, a granularity of the Gy interface is an IP-CAN bearer. That the Gy interface is a bearer-level interface and a granularity of the Gy interface on the EPC is an IP-CAN bearer refers to: On the EPC network, for one IP-CAN Bearer in the IP-CAN Session between the UE and the Gateway (where the IP-CAN Bearer is also referred to as an IP connection bearer), one Gy session is established between the PCEF and the OCS for the IP-CAN Bearer. The charging system mentioned in the embodiments of the present disclosure may be, if no special instruction is provided, the online charging system OCS 101 or an Offline Charging System, (OFCS), the OFCS is not shown in FIG. 2; refer to FIG. 1. If the charging system is the OFCS, a charging session refers to a Gz session established on a Gz interface, and the Gz interface is a bearer-level interface. Also, a serving gateway (S-GW) 105 is connected to the PCEF 104.

Figure 3:
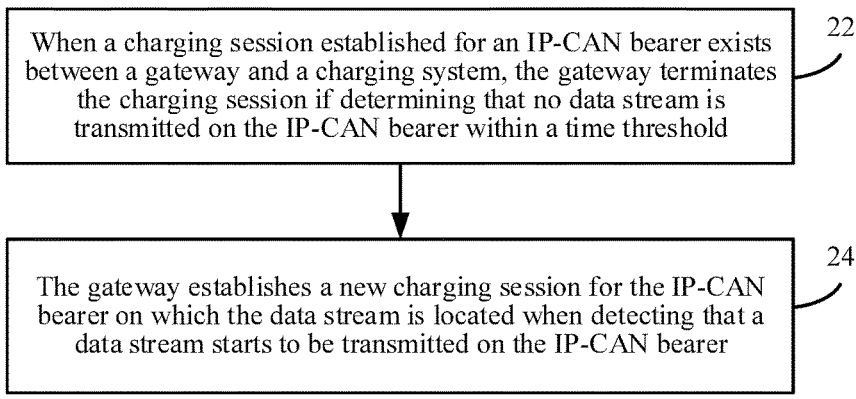
FIG. 3 is a schematic flowchart of a charging session management method according an embodiment of the present disclosure.

After main interfaces and network nodes involved in the present disclosure are described, content of the present disclosure is elaborated next in a method process form. When UE is in a state of already accessing to a network, there is always an IP-CAN bearer between a Gateway and the UE (which is a feature of an Always-on network), where the IP-CAN bearer is used to transmit a data flow of the UE, and a charging session exists between the Gateway and a charging system. FIG. 3 is a schematic flowchart of a charging session management method according an embodiment of the present disclosure, including:

Step 22: When a charging session established for the IP-CAN bearer exists between the Gateway and the charging system, the Gateway terminates the charging session if determining that no data flow is transmitted on the IP-CAN bearer within a time threshold.

The time threshold may be preconfigured in the Gateway, may be acquired by the Gateway from the charging system using a charging session interface, or may be carried in a charging and control policy acquired by the Gateway from a PCRF. In step 22, the Gateway terminates, using any one of the following manners, the charging session if determining that no data flow is transmitted on the IP-CAN bearer within a time threshold may be:

(1) The Gateway monitors the IP-CAN bearer; when there is no data flow on the IP-CAN bearer, the Gateway starts timing; and when determining that no data flow is transmitted on the IP-CAN bearer within the time threshold, the Gateway terminates the charging session established for the IP-CAN bearer.

(2) When determining that there is no occupied quota on the IP-CAN bearer, the Gateway starts timing; and when detecting that no new data flow is transmitted on the IP-CAN bearer within the time threshold, the Gateway terminates the charging session established for the IP-CAN bearer.

(3) An OCS starts timing when there is no quota occupied on the IP-CAN bearer; when no new quota request is received from the Gateway within the time threshold, the OCS sends a session termination request to the Gateway; and after receiving the session termination request, the Gateway terminates the charging session. The new quota request is generally initiated by the Gateway to the OCS when detecting that a data flow is being transmitted.

In manner (2) and manner (3), that there is no occupied quota on the IP-CAN bearer includes: a quota applied for the IP-CAN bearer by the Gateway is invalid because of timeout caused by idleness, a quota applied for the IP-CAN bearer by the Gateway is released after being normally used, or the like.

Preferably, the data flow monitored by the Gateway and described in the embodiments of the present disclosure is a data flow involving charging, and a heartbeat packet for maintaining an IP-CAN bearer, a signaling message for establishing an IP-CAN bearer, or the like does not belong to the data flow involving charging.

Step 24: The Gateway establishes a new charging session for the IP-CAN bearer when detecting that a data flow transmission starts to be transmitted on the IP-CAN bearer.

In this embodiment, a data flow transmission status on an IP-CAN bearer between UE and a Gateway is monitored, implementing dynamic establishment and termination of a charging session, and further ensuring effective use of charging system resources. Therefore, when the IP-CAN bearer is in an idle state, a charging system resource allocated by a charging system for the IP-CAN bearer can be released.

In the embodiment corresponding to FIG. 3, when the Gateway is to establish a first IP-CAN bearer with the UE, the method further includes: establishing, by the Gateway, the first IP-CAN bearer with the UE and monitoring a data flow transmission status on the first IP-CAN bearer; and when the Gateway detects that a data flow transmission starts to be transmitted on the first IP-CAN bearer, establishing, by the Gateway, a charging session with the charging system for the first IP-CAN bearer.

The first IP-CAN bearer is also referred to as a default bearer (also referred to as Default Bearer) on an EPC, and is an IP-CAN bearer that is initiated earliest when the UE turns from an offline state to a state of accessing to the EPC. The UE usually initiates a default bearer establishment request to the Gateway when the UE is powered on or is changed from an airplane mode to a network mode. Then after the default bearer is established, a data service involving charging is not necessarily started. In this way, in this embodiment, an extended solution is provided: when no data flow (which may be a data flow involving charging) is transmitted on the IP-CAN bearer, the charging session between the Gateway and the charging system is not established immediately, and the charging session is established only when a data flow involving charging is transmitted on the IP-CAN bearer. Therefore, according to this improvement, a charging session is established for the IP-CAN bearer when a data service involving charging is transmitted on the IP-CAN bearer.

In a possible implementation solution, based on the embodiment corresponding to FIG. 3, when an operator establishes the first IP-CAN bearer for the UE, the UE further needs to be authenticated, and in this case, the foregoing extended solution is used for the charging session between the Gateway (which may be a PCEF) and the charging system and is established when the Gateway detects transmission of the data flow. Therefore, the foregoing authentication process needs to be completed using another interface that has been established, the Gateway receives a request for establishing the first IP-CAN bearer from the UE, and sends a charging and control policy request to the PCRF; the Gateway receives a result that is of authentication performed by the charging system on the UE and that is carried in a charging and control policy response returned by the PCRF, where the result of the authentication performed by the charging system on the UE is completed by means of a session channel between the PCRF and the charging system; when determining that the authentication succeeds, the Gateway establishes the first IP-CAN bearer with the UE; or when determining that authentication fails, the Gateway rejects establishment of the bearer.

In addition to carrying the result of the authentication performed by the charging system on the UE, the charging and control policy response returned by the PCRF may further carry charging session establishment delay instruction information. The Gateway establishes the first IP-CAN bearer according to the result of the authentication, and determines, according to the charging session establishment delay instruction information, to establish the charging session with the charging system for the first IP-CAN bearer only when detecting that transmission of the data flow (which may be the data flow involving charging) starts on the first IP-CAN bearer.

Preferably, the result of the authentication may be directly used as the charging session establishment delay instruction information, and in this case, the charging and control policy response returned by the PCRF carries only the result of the authentication. The Gateway establishes the first IP-CAN bearer according to the result of the authentication, and determines, according to the result of the authentication, to establish the charging session with the charging system for the first IP-CAN bearer only when detecting that transmission of the data flow (which may be the data flow involving charging) starts on the first IP-CAN bearer. In this exemplary solution, the result of the authentication has a same function as that of the foregoing establishment delay instruction information.

Figure 4:
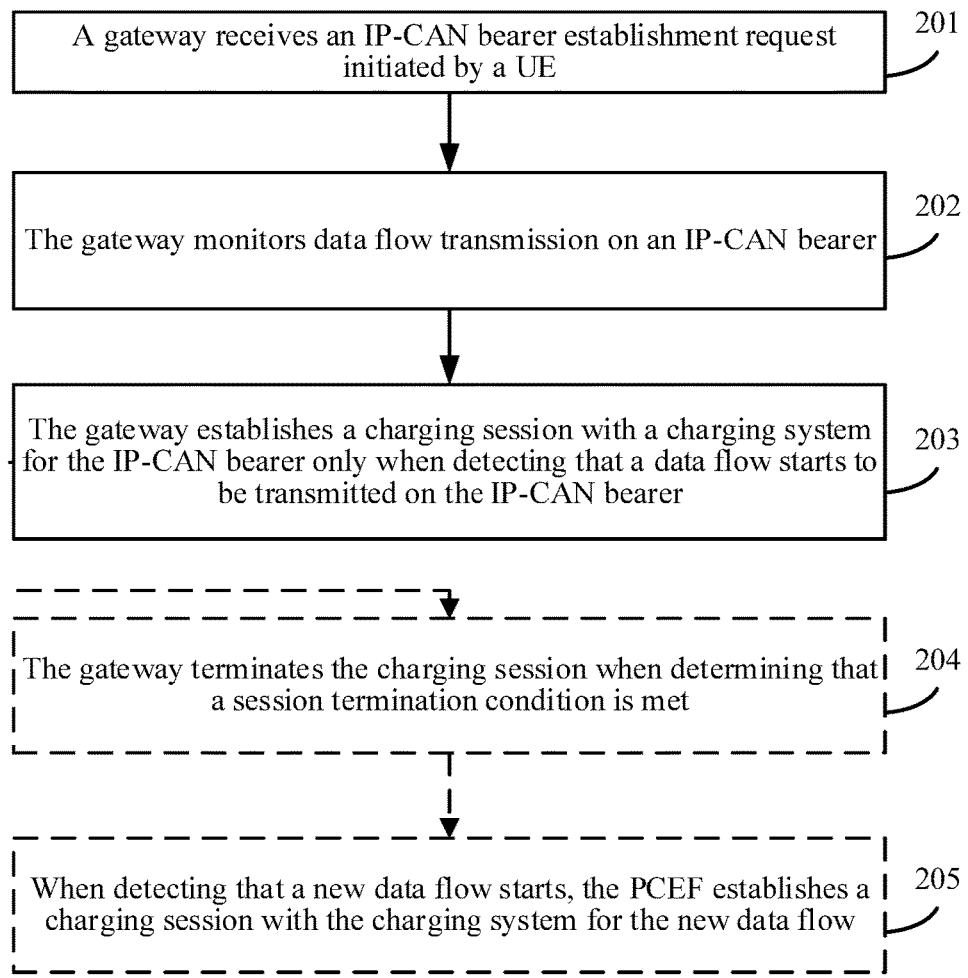
FIG. 4 is a schematic flowchart of a charging session management method according an embodiment of the present disclosure.

Generally, transmission of a data flow starts after the UE initiates an IP-CAN bearer establishment request. Therefore, as shown in FIG. 4, implementation of the present disclosure and an optional extended solution are described as follows with reference to a process in which the UE initiates an IP-CAN bearer establishment request.

Step 201: A Gateway receives an IP-CAN bearer establishment request initiated by UE.

The IP-CAN bearer establishment request herein includes: a default bearer establishment request and/or a dedicated bearer establishment request. The default bearer establishment request is a specific manifestation of a request for establishing the first IP-CAN bearer in this embodiment. The dedicated bearer establishment request is a request that is initiated by the UE to the Gateway and that is for establishing another IP-CAN bearer that is different from the first IP-CAN bearer, and is used to provide dedicated QoS for a particular service. The IP-CAN bearer establishment request message belongs to known techniques and therefore is not described herein.

Step 202: The Gateway monitors data flow transmission on the IP-CAN bearer.

A manner of executing step 202 by the Gateway may be a default manner set in the Gateway. That is, to establish a charging session corresponding to any IP-CAN bearer, the Gateway first monitors data flow transmission on the IP-CAN bearer, and when a data flow transmission starts to be transmitted on the IP-CAN bearer, establishes the charging session with a charging system for the IP-CAN bearer.

Besides the default manner, the following manner may also be acceptable: the Gateway monitors data flow transmission according to a charging session establishment delay instruction, and establishes a charging session with a charging system for a corresponding IP-CAN bearer when a data flow transmission starts to be transmitted. The charging session establishment delay instruction may be added to a charging and control policy requested by the Gateway to a PCRF. In this embodiment, when the UE needs to be authenticated, the solution of completing authentication on the UE using a session channel between the PCRF and an OCS in the embodiment corresponding to FIG. 3 may be used.

Preferably, the data flow refers to a data flow that needs to be charged.

Step 203: The Gateway establishes a charging session with a charging system for the IP-CAN bearer when detecting that a data flow transmission starts to be transmitted on the IP-CAN bearer.

When multiple IP-CAN bearers are established in the Gateway, the Gateway may monitor data flow transmission on the multiple IP-CAN bearers simultaneously, and when a data flow is transmitted on one of the IP-CAN bearers, establish a charging session for the IP-CAN bearer on which the data flow is transmitted.

In this embodiment, a manner in the prior art in which a Gateway establishes a corresponding charging session with a charging system after establishing an IP-CAN bearer is improved. A Gateway monitors a data flow transmission status on the established IP-CAN bearer, and establishes a charging session for the IP-CAN bearer only when detecting that a data flow is transmitted. Considering that a particular time interval probably exists in practice between establishment of an IP-CAN bearer and data flow transmission initiated based on the IP-CAN bearer, if a corresponding charging session is established when the IP-CAN bearer is established, a resource occupied for the charging session within the time interval is not used effectively. Therefore, in this embodiment, resources of a charging system and a Gateway are used more effectively.

When the embodiment corresponding to FIG. 4 and the embodiment corresponding to FIG. 3 are combined into a complete solution, after step 203, the following steps are further included. The three manners of determining, by the Gateway, to terminate the charging session described in step 22 may be broadly described in this embodiment, which is as follows:

Step 204: The Gateway terminates the charging session when determining that a session termination condition is met.

The session termination condition may be preconfigured in the Gateway, may be acquired by the Gateway from the charging system using a charging session interface, or may be carried in a charging and control policy acquired by the Gateway from the PCRF. A manner of meeting the session termination condition may be any one of the following manners, and the data flow described in the manners is represented as an uplink or downlink data flow.

(1) The Gateway monitors the IP-CAN bearer; in a case in which the Gateway determines that no data flow is on the IP-CAN bearer, the Gateway starts timing; when the Gateway detects no uplink or downlink data flow transmission on the corresponding IP-CAN bearer within a time threshold, the session termination condition is met.

(2) In a case in which the Gateway determines that there is no quota occupied on the IP-CAN bearer, the Gateway starts timing; when no uplink or downlink data flow is transmitted within a time threshold, the session termination condition is met.

(3) When the Gateway receives a session termination request from the charging system, the session termination condition is met. The session termination request is sent when the charging system determines that there is no occupied quota corresponding to the IP-CAN bearer and no new quota request corresponding to the IP-CAN bearer is received within the time threshold.

Step 205: When detecting that another data flow transmission starts to be transmitted on the IP-CAN bearer, the PCEF establishes a charging session with the charging system for the IP-CAN bearer.

In this embodiment, when an IP-CAN bearer is established, a charging session is not established immediately because no service data traffic may be involved at this time. Further, when the session termination condition is met, the charging session that has been established between the PCEF and the charging system is terminated. In the foregoing delay and termination manners, resources used for establishing a charging session are reduced while user communication is ensured.

In the prior art, one or more services may include different QoS-based data flows. To facilitate association between the service data flows and quota sharing across an IP-CAN bearer, reduce a quota fragment, and improve quota management efficiency of the charging system, in an embodiment of the present disclosure, quota management and use between the Gateway and the charging system is improved. The exemplary solution is applicable to both the embodiment corresponding to FIG. 3 and the embodiment corresponding to FIG. 4, and is:

If one IP-CAN session includes one or more IP-CAN bearers, the one or more IP-CAN bearers use a charging session established for a first IP-CAN bearer. That is, one IP-CAN session has only one charging session, and all IP-CAN bearers in the IP-CAN session share the charging session.

Further, the Gateway receives quotas that are allocated for different rating groups RGs in the IP-CAN session (also referred to as IP-CAN Session) and that are delivered by the charging system. When multiple IP-CAN Bearers corresponding to a same RG exist in the same IP-CAN Session, the multiple IP-CAN Bearers share a quota allocated for the RG.

The Gateway collects data flow information on the IP-CAN Bearers, and separately reports the collected data flow information when a reporting condition is met, where the data flow information includes QoS information of the IP-CAN Bearers so that the charging system charges the data flows according to the QoS information.

Based on the improvement of sharing the quota allocated for the RG, the charging session established between the Gateway and the charging system may be terminated in multiple possible cases, including:

(1) When the charging session is provided to only one IP-CAN Bearer (also referred to as IP-CAN bearer in the embodiments), that is, the IP-CAN Session includes only one IP-CAN bearer, when determine that transmission of a data flow on the IP-CAN Bearer is not detected within the time threshold, and the Gateway terminates the charging session established for the IP-CAN bearer (which is also applicable to the other charging session termination manners given in step 22 and step 204).

(2) When the charging session is shared by at least two IP-CAN Bearers of a same RG, that is, the IP-CAN Session includes at least two IP-CAN Bearers, the Gateway can terminate the charging session shared by the at least two IP-CAN Bearers only when detecting that no data flow is transmitted on all the IP-CAN Bearers in the IP-CAN Session within the time threshold (which is also applicable to the other charging session termination manners given in step 22 and step 204).

Based on the bearer-level charging session in step 22 or step 204, the following describes, with a specific example, in detail how to implement session termination in a session-level charging session. The time threshold is a session keeping time threshold, and the IP-CAN session refers to an IP-CAN Session, where the IP-CAN Session includes one or more IP-CAN bearers (which refer to: IP-CAN Bearers). A method for determining to terminate the charging session includes:

Method 1: The Gateway receives a session keeping time threshold carried in charging information that is sent by an OCS through a Gy interface, where the session keeping time threshold may be named as Session-Keeping-Time. After receiving the session keeping time threshold, the Gateway starts timing when transmission of a data flow corresponding to the IP-CAN Session stops (that is, when a data flow is transmitted on none of the IP-CAN Bearers in the IP-CAN Session); after timing duration exceeds the session keeping time threshold, the Gateway initiates a session termination request to the OCS, where the session termination request is a Credit Control Request-Terminate (CCR-T). If the Gateway detects, in a timing process, that another data flow is transmitted in the corresponding IP-CAN Session, the foregoing timing is zeroed out, and timing restarts when transmission of the another data flow stops.

Method 2: The Gateway receives a session keeping time threshold carried in charging information that is sent by an OCS through a Gy interface, where the session keeping time threshold may be named as Session-Keeping-Time. After the PCEF receives the threshold, in order not to affect an existing quota management mechanism, the Gateway reacts differently according to whether a quota has a corresponding Quota-Holding-Time, which is: if the quota has a Quota-Holding-Time delivered by the OCS, the Gateway starts timing when Quota-Holding-Times of all quotas in the IP-CAN Session expire (that is, when there is no occupied quota in the IP-CAN Session); if the quota has no corresponding Quota-Holding-Time, after determining that the PCEF has the session keeping time threshold, the PCEF starts timing when transmission of a data flow in the PCEF stops, and when timing duration exceeds the session keeping time threshold, the PCEF initiates a session termination request CCR-T to the OCS. If another data flow is transmitted in the IP-CAN Session or the Gateway requests for a new quota in a timing process, the timing is zeroed out, and timing restarts when a timing condition is met, where the timing condition is: there is no quota occupied and transmission of a data flow in the PCEF stops. A value of the Session-Keeping-Time may also be 0, and in this case, after the Quota-Holding-Times of all the quotas expire, the PCEF immediately initiates the session termination request CCR-T.

Method 3: The Gateway may use a manner in which the Gateway configures a Session-Keeping-Time. For a value of the Session-Keeping-Time and an operation manner, reference may be made to method 1 or method 2, and details are not described herein again.

Method 4: When the Gateway receives a charging session termination instruction from the charging system, the session termination condition is met. The charging session termination instruction is sent only when the charging system determines that there is no quota occupied for the IP-CAN session and no new quota request for the IP-CAN session is received within the time threshold.

In the prior art, due to quota expiration, in some cases (for example, the quota expiration is reported to the OCS), the PCEF automatically requests for a new quota; in this way, there is always an occupied quota. Therefore, in method 2, to implement the method of the present disclosure, the operation of automatically requesting for a new quota needs to be changed: automatically requesting for a new quota is canceled, and instead, after the quota expiration, the PCEF does not automatically request for a new quota but initiates an operation of requesting for a new quota when a user requests a next service.

According to the descriptions of the foregoing method processes, a main process of this embodiment of the present disclosure is described. However, in specific implementation, the following points need to be described in the present disclosure, including: how to implement the method of the present disclosure based on an OFCS; how to apply the method of the present disclosure to establishment of a session between a PCRF and a TDF; and how to, on this basis, further reduce a waste of core network resources in an Always-on mode by expanding a charging session manner between a PCEF and an OCS. The following describes the points one by one with reference to flowcharts. It should be emphasized that a person skilled in the art may implement, based only on the disclosed implementation manners, the points separately or in a combined manner without creative efforts, and the implementation shall fall within the protection scope of the present disclosure.

Figure 5:
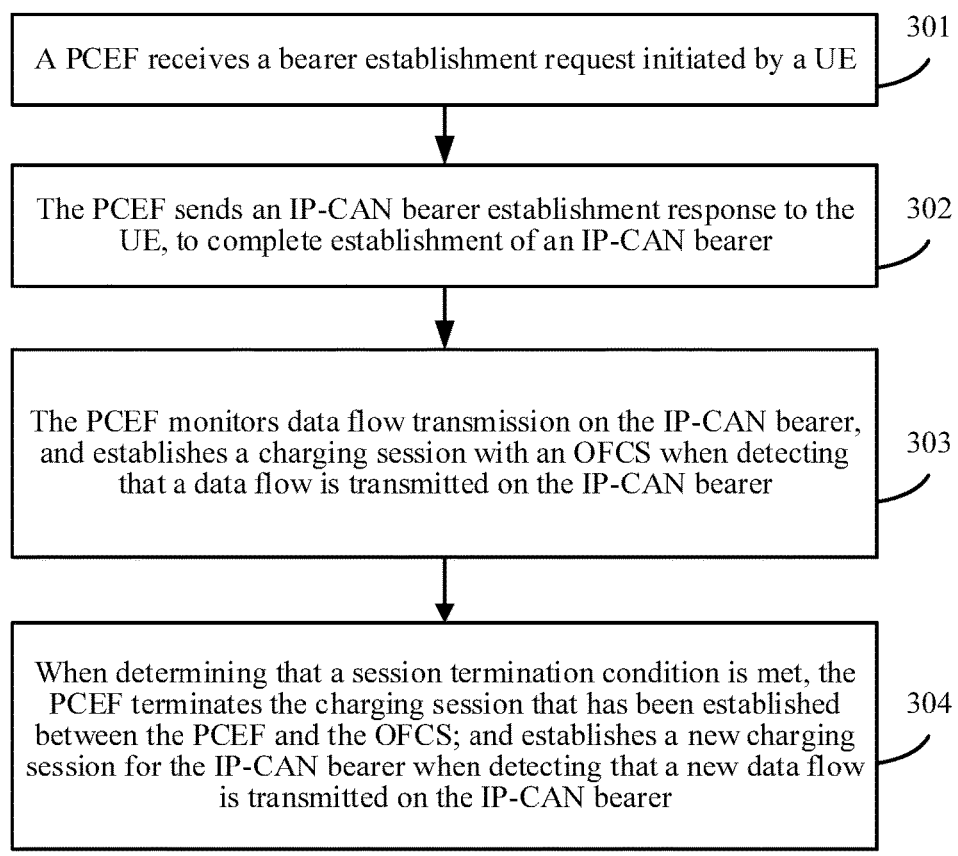
FIG. 5 is a schematic flowchart of a charging session management method according an embodiment of the present disclosure.

Implementation of an embodiment of the present disclosure is introduced using a method process corresponding to FIG. 5, where a charging system is preferably an OCS. A charging system includes an online charging system OCS and an OFCS. The following describes implementation of an embodiment of the present disclosure in an OFCS environment with reference to FIG. 5. A Gateway is directly represented by a network node PCEF. The OCS and the OFCS may be simultaneously used in the charging system. Therefore, a person skilled in the art can work out a manner of combining the OCS and the OFCS with reference to implementation content, respectively based on the OCS and the OFCS, disclosed in the present disclosure.

Step 301: A PCEF receives an IP-CAN bearer establishment request initiated by UE.

Step 302: The PCEF sends an IP-CAN bearer establishment response to the UE, to complete establishment of an IP-CAN bearer.

Step 303: The PCEF monitors data flow transmission on the IP-CAN bearer, and establishes a charging session with an OFCS when detecting that a data flow is transmitted on the IP-CAN bearer.

Step 304: When determining that a session termination condition is met, the PCEF terminates the charging session that has been established between the PCEF and the OFCS; and establishes a new charging session for the IP-CAN bearer when detecting that a new data flow is transmitted on the IP-CAN bearer.

The session termination condition may be preconfigured in the PCEF or may be carried in a charging and control policy acquired from a PCRF by the PCEF. A manner of terminating, by the PCEF when determining that a session termination condition is met, the charging session that has been established between the PCEF and the OFCS includes:

(1) The Gateway monitors the IP-CAN bearer; in a case in which the Gateway determines that no data flow is on the IP-CAN bearer, the Gateway starts timing; and when determining that no data flow is transmitted on the IP-CAN bearer within a time threshold, the Gateway terminates the charging session established for the IP-CAN bearer.

(2) When determining that there is no occupied quota on the IP-CAN bearer, the Gateway starts timing; and when detecting that no new data flow is transmitted on the IP-CAN bearer within a time threshold, the Gateway terminates the charging session established for the IP-CAN bearer.

In this embodiment, when an IP-CAN bearer is established, transmission of a charged data flow is probably not involved. Therefore, when the IP-CAN bearer is established, the charging session is not immediately established for the established bearer. Further, when a session termination condition is met, the charging session that has been established between the PCEF and the OFCS is terminated. According to the delay and termination manners, resources used for establishing a charging session are reduced while user communication is ensured.

The embodiment for implementing the present disclosure in the OFCS is very similar to the embodiment that is for implementing the present disclosure in the OCS and that corresponds to FIG. 4, but specific charging manners in the two embodiments have some differences. The following is a further improvement solution based on the embodiment in FIG. 5.

Figure 6:
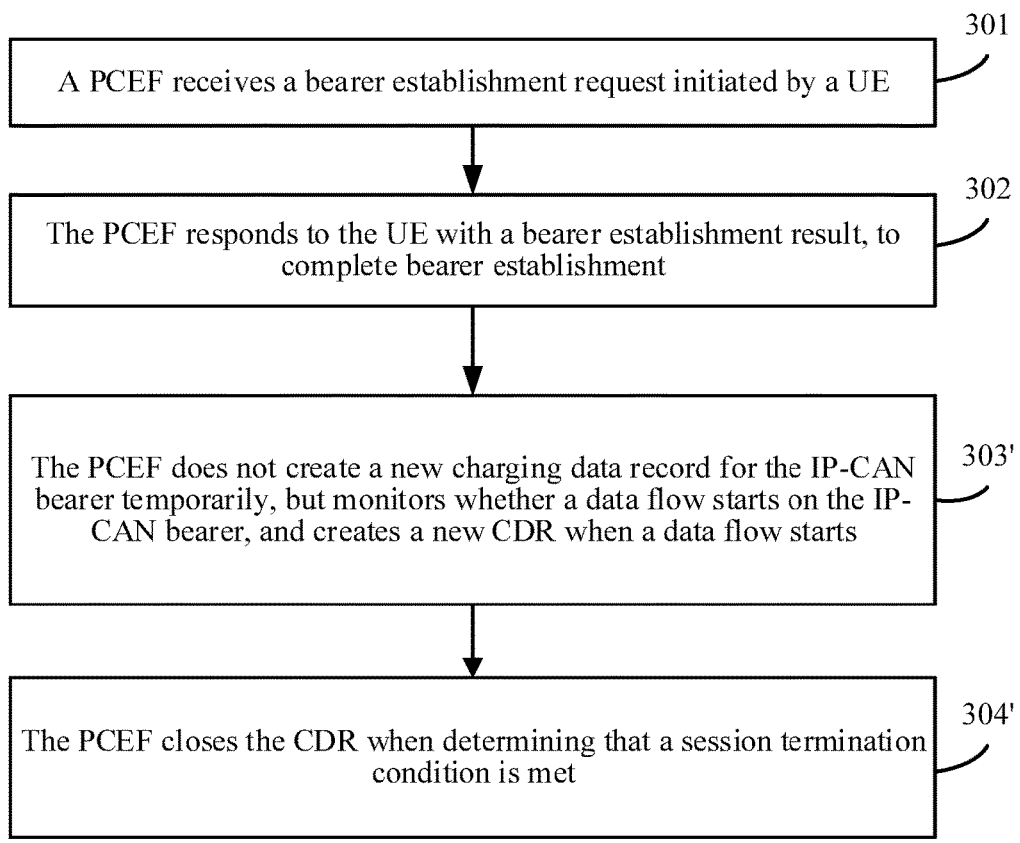
FIG. 6 is a schematic flowchart of a charging session management method according an embodiment of the present disclosure.

If a Charging Data Function (CDF) may further be built in the Gateway in which the PCEF is located, the charging session is not established between the PCEF and the OFCS, and step 303 and step 304 are replaced with step 303' and step 304' for execution, which, as shown in FIG. 6, are as follows:

Step 303': The PCEF does not create a new Charging Data Record (CDR), for the IP-CAN bearer temporarily, but monitors whether a data flow on the IP-CAN bearer is started, and creates a new CDR when a data flow transmission starts.

Step 304': The PCEF closes the CDR when determining that a session termination condition is met.

In the foregoing optional solution, based on the embodiment corresponding to FIG. 5, a feature of offline charging is further explored, and resource use efficiency is further improved with reference to a core disclosure point of the present disclosure so that creation and disabling of a CDR can be closely combined with a current status of a data flow in a PCEF, avoiding ineffective use of resources.

Figure 7:
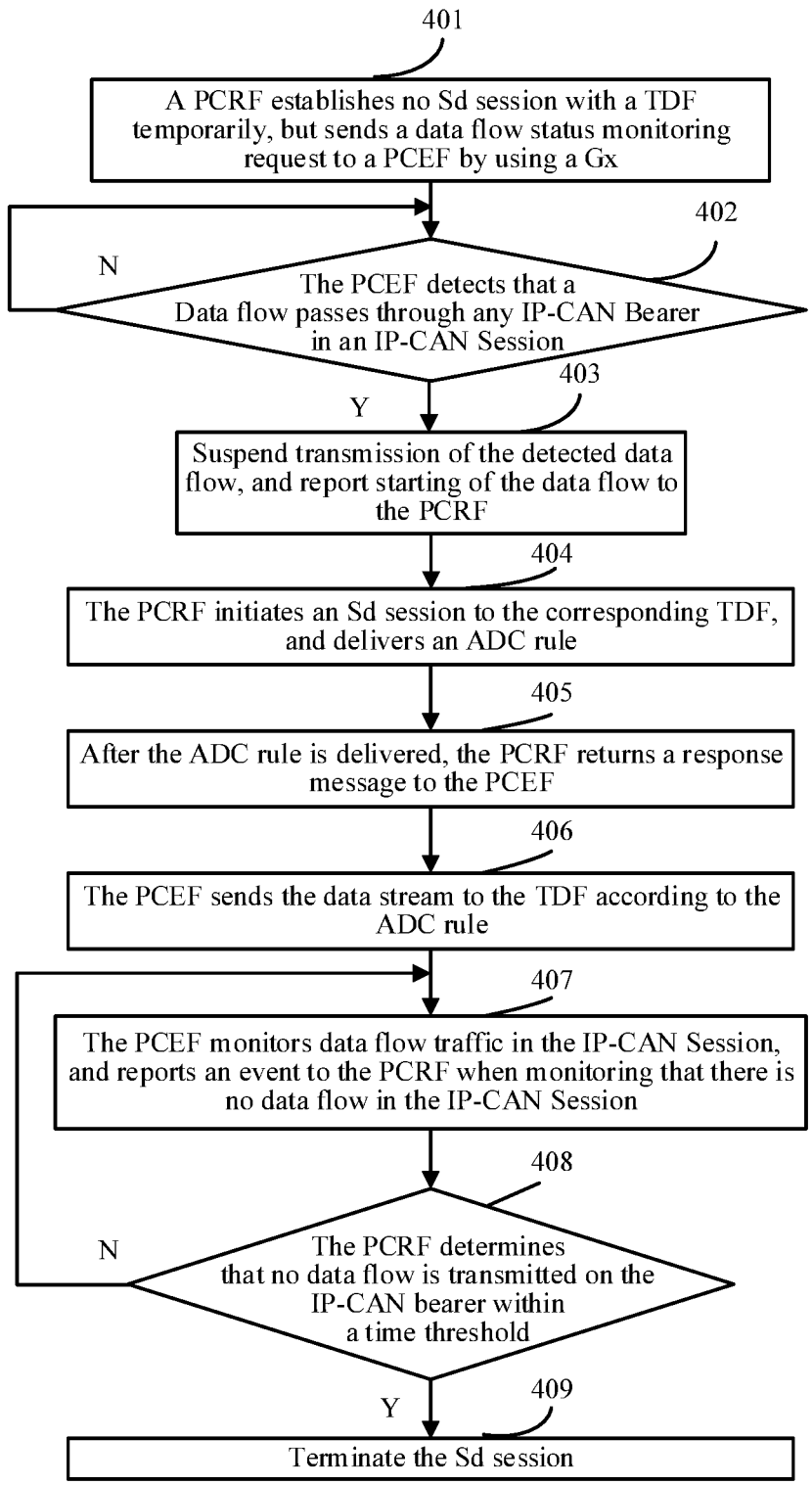
FIG. 7 is a schematic flowchart of a charging session management method according an embodiment of the present disclosure.

The foregoing describes in a process of establishing the charging session, how to use a method of the present disclosure to reduce resources used for establishing the charging session. An idea of the present disclosure may further be used in an Sd session between a PCRF and a TDF, of which a processing process is shown in FIG. 7. Establishment of the Sd session may be applied together with the improvement methods in the embodiments corresponding to FIG. 3 and FIG. 4. A person skilled in the art can also combine the foregoing embodiments for implementation based on the solutions of the foregoing embodiments and with reference to a use manner of a Gx interface, a Gy interface, an Sd interface, or the like in the prior art. An IP-CAN session is represented as an IP-CAN Session, and an IP-CAN bearer is represented as an IP-CAN Bearer.

Step 401: A PCRF has established a Gx interface with a PCEF; the PCRF establishes no Sd session with a TDF temporarily, but adds, to a delivered charging and control policy using a Gx session, a policy in which the PCEF is instructed to monitor a data flow status and report a related event.

Step 402: When detecting that a data flow transmission starts passing through any IP-CAN Bearer in an IP-CAN Session, the PCEF performs step 403; if the PCEF monitors that no data stream passes through an IP connection bearer in an IP-CAN session, the PCEF continues monitoring data traffic in the IP-CAN Session.

Step 403: When detecting that the data flow transmission starts to be transmitted, the PCEF suspends transmission of the detected data flow to the TDF, and reports a data flow transmission event to the PCRF.

Step 404: The PCRF initiates an Sd session establishment request to the corresponding TDF, and delivers an ADC rule using the established Sd session.

Step 405: After the ADC rule is delivered, the PCRF returns an event report response message to the PCEF.

Step 406: The PCEF sends the data flow to the TDF according to the ADC rule.

Step 407: The PCEF monitors data flow transmission in the IP-CAN Session, and reports a data flow transmission end event to the PCRF when detecting that the data flow transmission in the IP-CAN Session stops.

Step 408: When determining, according to the event reported by the PCEF, that no data flow is transmitted on the IP-CAN bearer within a time threshold, the PCRF performs an operation in step 409 of terminating the Sd session established for the IP-CAN Session.

The PCRF determines that no data flow is transmitted on the IP-CAN bearer within the time threshold may be based on specific implementation of step 22 in FIG. 3, which is as follows:

The Gateway monitors the IP-CAN session (also referred to as IP connection Session); the Gateway starts timing in a case in which the Gateway determines that no data flow is in the IP-CAN session; when determining that no data flow is transmitted in the IP-CAN session within the time threshold, the Gateway terminates the charging session established for the IP-CAN session; and when determining that a data flow stops transmitting in the IP-CAN session, the Gateway reports a data flow transmission end event to the PCRF.

The PCRF starts timing after receiving the data flow transmission end event reported by the PCEF, and terminates the Sd session when receiving, within the time threshold, no new data flow transmission event sent by the PCEF.

In this embodiment of the present disclosure, a specific process of establishing and terminating an Sd session between a PCRF and a TDF is described. On a basis of ensuring an Sd session function, the Sd session is established using a delay; when determining that no data flow is transmitted in the foregoing IP-CAN session within a time threshold, the PCRF determines a manner of terminating the Sd session, improving a deficiency in the prior art of a resource waste existing since creation of the Sd session.

Figure 8:
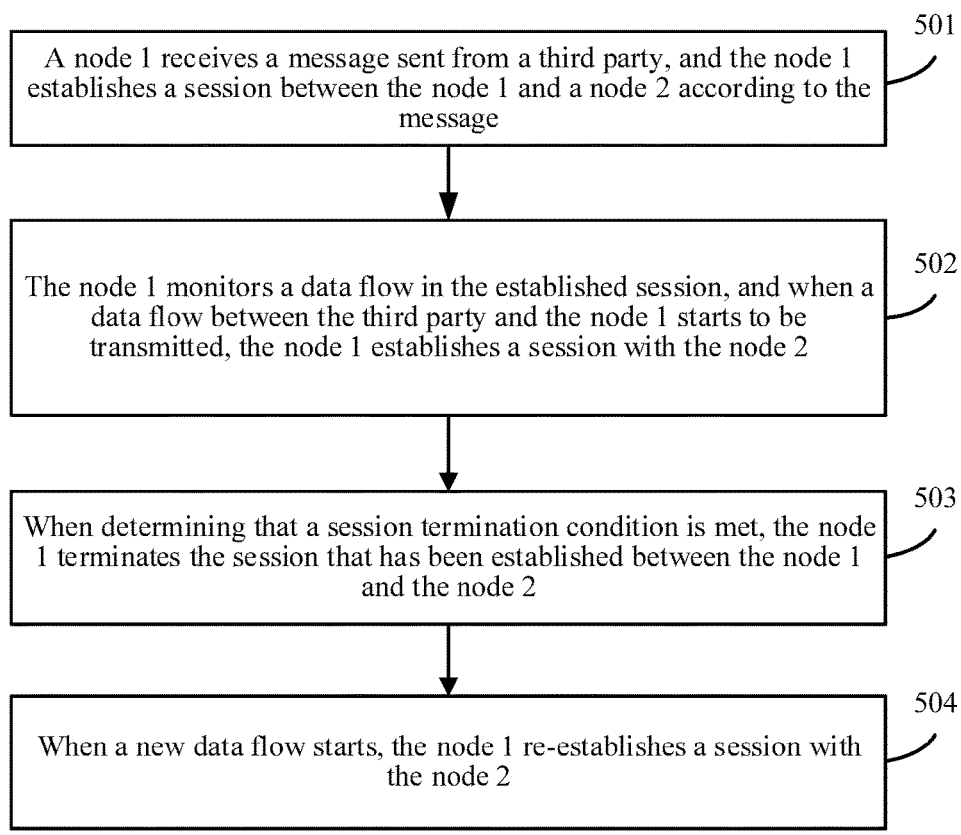
FIG. 8 is a schematic flowchart of a charging session management method according an embodiment of the present disclosure.

In the foregoing embodiments, implementation of a charging session management method with reference to the present disclosure is given from the perspective of online charging, offline charging, and an Sd session between a PCRF and a TDF. Therefore, the charging session management method provided in the present disclosure may further probably be applied to other modules in the communications field. Therefore, a broader method is protected next, so as to protect objects that probably be covered by the present disclosure. As shown in FIG. 8, the method includes:

Step 501: A node 1 receives a message sent from a third party, and the node 1 establishes a session between the node 1 and a node 2 according to the message.

Step 502: The node 1 monitors a data flow in the established session, and when the data flow between the third party and the node 1 starts to be transmitted, the node 1 establishes a session with the node 2.

Step 503: When determining that a session termination condition is met, the node 1 terminates the session that has been established between the node 1 and the node 2.

Step 504: When a new data flow between the node 1 and a requester starts to be transmitted, the node 1 re-establishes a session with the node 2.

In a first scenario, the node 1 is corresponding to the PCEF in the foregoing embodiments, the node 2 is corresponding to the OCS, the third party is the UE, the session message is the bearer establishment request, and a session that is established with a delay is the charging session. In a second scenario, the node 1 is corresponding to the PCEF in the foregoing embodiments, the node 2 is corresponding to the OFCS, the third party is the UE, and the session message is the bearer establishment request. In a third scenario, the node 1 is corresponding to the PCRF in the foregoing embodiments, the node 2 is corresponding to the TDF, the third party is the PCEF, the session message is a data flow status message reported by the PCEF, and the session is the Sd session that is established with a delay. For specific process implementation manners, refer to the embodiments, and details are not described herein again.

Figure 9:
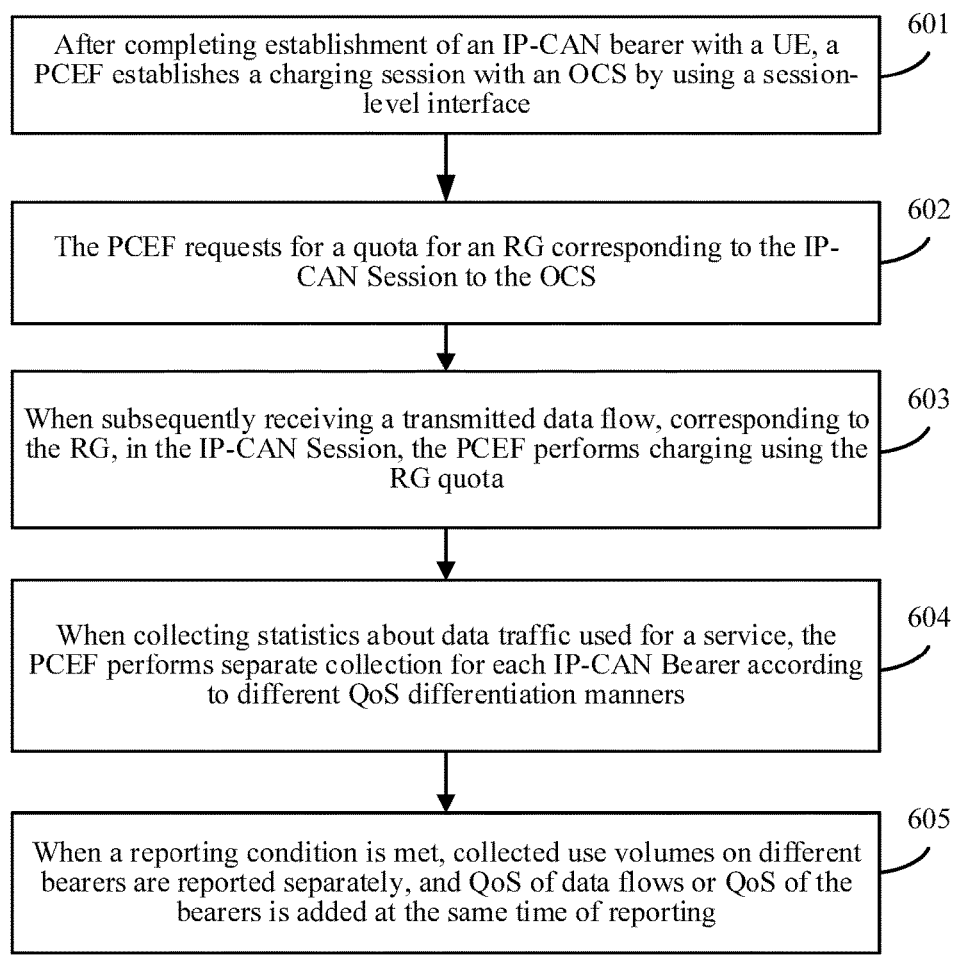
FIG. 9 is a schematic flowchart of a charging session management method according an embodiment of the present disclosure.

The foregoing embodiments of the present disclosure involving the charging session management method are improvement in effective use of a charging session resource based on data flow monitoring. With regard to the improvement in the charging session resource, improvement may further be made to data flow quota management on an IP-CAN bearer. The following introduces an improvement manner for data flow quota management performed by an OCS. To implement the quota management improvement method, a premise is: multiple IP-CAN Bearers in one IP-CAN Session share a charging session. A specific process is shown in FIG. 9.

When a charging system is the OCS, a quota management manner is as follows:

Step 601: A PCEF establishes an IP-CAN bearer with UE, and establishes a charging session with the OCS for an IP-CAN Session.

The PCEF may establish the IP-CAN bearer with the UE in a manner in the embodiments and/or embodiment corresponding to FIG. 3 and/or FIG. 4, and details are not described herein again.

Step 602: The PCEF requests for a quota for an RG of the IP-CAN Session to the OCS.

Step 603: The PCEF uses the RG quota when subsequently receiving a transmitted data flow, corresponding to the RG, in the IP-CAN Session.

Specifically, multiple IP-CAN Bearers are corresponding to one IP-CAN Session. Different IP-CAN Bearers probably have a same RG, and the PCEF requests a quota for each RG in the IP-CAN session. If multiple IP-CAN Bearers have a same RG, flows corresponding to the same RG share a quota applied for the RG, and subsequently, if a new IP-CAN Bearer is established and a flow corresponding to the RG is on the new IP-CAN Bearer, the flow also shares the quota applied for the RG.

Based on the foregoing quota use manner, a corresponding charging information collection and reporting method is as follows:

Step 604: When collecting quota use information of a service data flow, the PCEF performs separate collection for each IP-CAN Bearer according to different QoS differentiation manners, that is, flows of a same RG on different IP-CAN Bearers share a same quota, but use information is collected separately.

Step 605: When a reporting condition is met, collected use volumes on the different IP-CAN Bearers are reported separately, and QoS of the data flow or QoS of the IP-CAN Bearer is added at the same time of reporting. The QoS of the data stream or the QoS of the IP-CAN Bearer is used to differentiate the use volumes of different QoS in a reporting message.

That a reporting condition is met includes: a preconfigured time interval is reached, an allocated RG quota has been used up, a data flow on an IP-CAN Bearer ends or stops, or the like.

Figure 10:
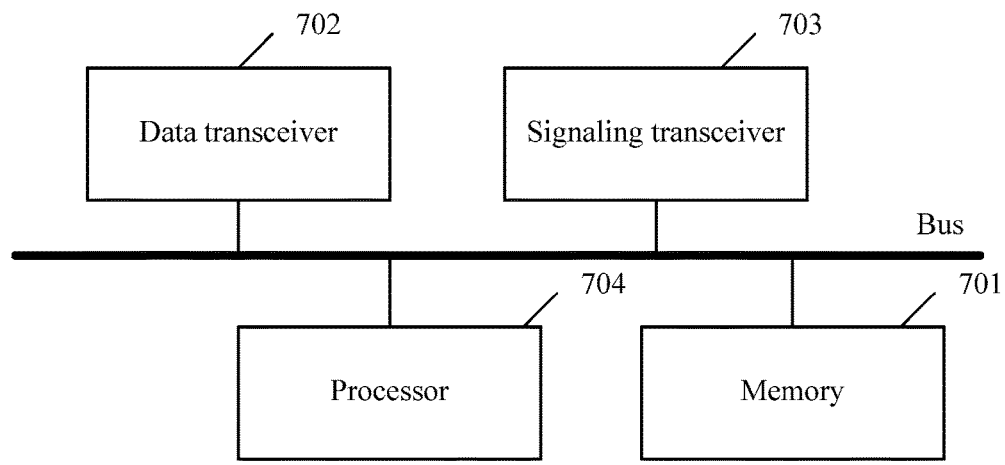
FIG. 10 is a schematic structural diagram of a Gateway according to an embodiment of the present disclosure.
Figure 11:
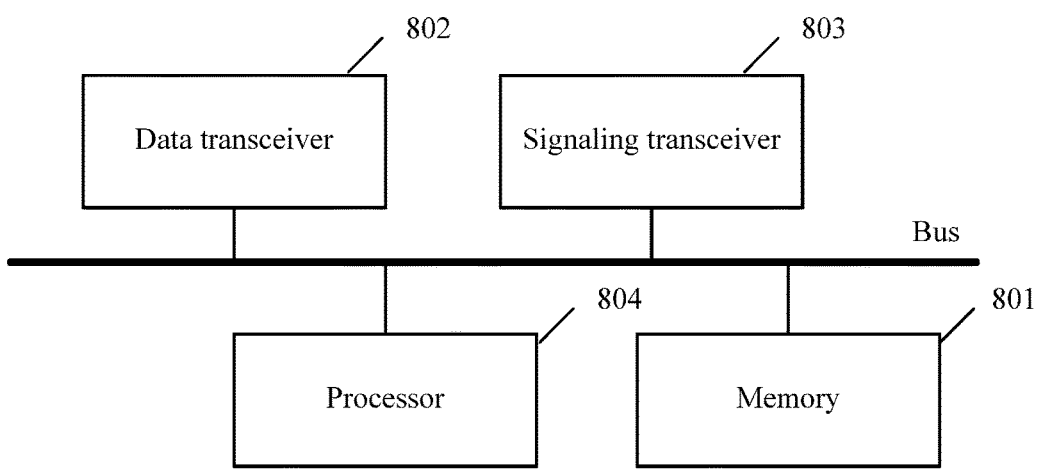
FIG. 11 is a schematic structural diagram of a Gateway according to an embodiment of the present disclosure.
Figure 12:
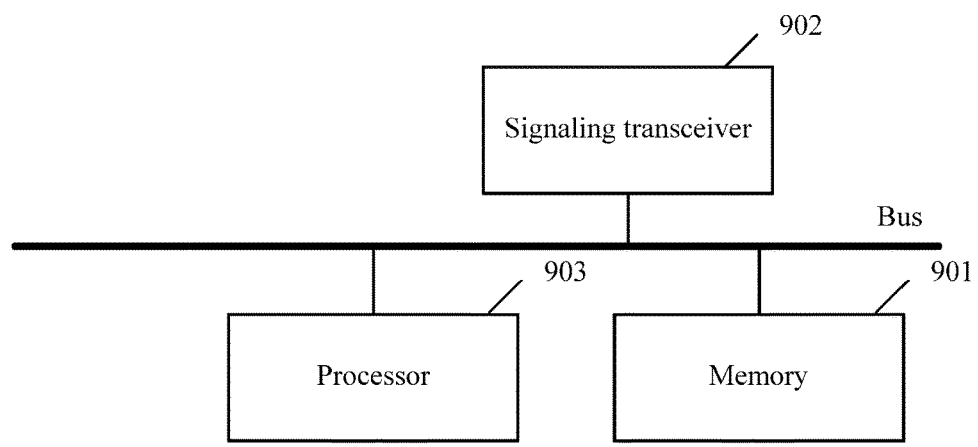
FIG. 12 is a schematic structural diagram of a policy and charging rules function according to an embodiment of the present disclosure.

Besides the method implementation, the embodiments of the present disclosure further provide the following several kinds of corresponding apparatus implementation of a Gateway and a Policy and Charging Rules Function entity, which are apparatus embodiments of the Gateway used to implement the present disclosure as shown in FIG. 10 and FIG. 11 and an apparatus embodiment of the Policy and Charging Rules Function entity used to implement the present disclosure as shown in FIG. 12.

As shown in FIG. 10, FIG. 10 is a schematic structural diagram of a Gateway for implementing a charging session management method according to an embodiment of the present disclosure, and the Gateway includes: a processor 704, a data transceiver 702, a signaling transceiver 703, and a memory 701.

The memory 701 is configured to store program code and a time threshold that are for the Gateway to perform an operation.

The data transceiver 702 is configured to transmit a data flow between the Gateway and UE, and is further configured to transmit the data flow to another node on a network.

The signaling transceiver 703 is configured to establish a charging session with a charging system, and is further configured to transmit a charging and control policy to a PCRF.

The processor 704 is configured to read data from the memory 701 and complete the following functions based on the data transceiver 702 and the signaling transceiver 703: when the charging session established for the IP-CAN bearer exists between the data transceiver 702 and the charging system, the processor 704 terminates the charging session if determining that no data flow is transmitted on the IP-CAN bearer within the time threshold; and the processor 704 establishes a new charging session for the IP-CAN bearer using the signaling transceiver 703 when detecting that a data flow transmission starts to be transmitted on the IP-CAN bearer.

Corresponding to implementation of the extended solution involving establishment of the first IP-CAN bearer in the embodiment in FIG. 3, the Gateway in this embodiment performs corresponding functions, that is, when the Gateway is to establish a first IP-CAN bearer with the UE, the processor 704 establishes the first IP-CAN bearer with the UE using the data transceiver 702, and monitors data flow transmission on the first IP-CAN bearer; and the processor 704 establishes the charging session with the charging system using the signaling transceiver 703 only when detecting, using the data transceiver 702, that a data flow transmission starts to be transmitted on the first IP-CAN bearer.

Corresponding to implementation of UE authentication further included in the extended solution involving establishment of the first IP-CAN bearer in the embodiment in FIG. 3, the Gateway in this embodiment performs corresponding functions, that is, when the first IP-CAN bearer is to be established, after the data transceiver 702 receives a request for establishing the first IP-CAN bearer from the UE, the processor 704 sends a charging and control policy request to the PCRF using the signaling transceiver 703; the signaling transceiver 703 receives a result that is of authentication performed by the OCS on the UE and that is carried in a charging and control policy response returned by the PCRF, where the authentication performed by the OCS on the UE is completed by means of a session channel between the PCRF and the OCS; and the processor 704 establishes the first IP-CAN bearer using the data transceiver 702 when determining that the UE has been authenticated, or rejects establishment of the bearer when determining that the UE fails to be authenticated.

Corresponding to implementation of the extended solution involving different manners of determining charging session termination in the embodiment in FIG. 3, the Gateway in this embodiment performs corresponding functions, that is, the processor 704 starts timing in a case in which the processor 704 determines that there is no data flow or occupied quota on the IP-CAN bearer, and terminates the charging session when no new data flow is transmitted on the bearer within the time threshold; or the processor 704 terminates the charging session when receiving a session termination request from the OCS, where the OCS starts timing in a case in which there is no quota occupied on the corresponding IP-CAN bearer, and the OCS sends the session termination request to the Gateway when determining that no new quota request is received within the time threshold.

In this embodiment, a manner of acquiring the time threshold includes: the processor 704 acquires the time threshold from the memory 701; or the time threshold is carried in the charging and control policy requested by the processor 704 from the policy and charging rules function PCRF using the signaling transceiver 703; or the time threshold is acquired by the processor 704 using the charging session between the signaling transceiver 703 and the OCS.

Corresponding to implementation of the extended solution involving providing data flow monitoring for the PCRF and reporting the related event in the embodiment in FIG. 3, where the related event includes a data flow transmission event and a data flow transmission end event, the Gateway in this embodiment needs to have corresponding functions, including: the signaling transceiver 703 receives an instruction, delivered by the PCRF, instructing the signaling transceiver 703 to report a monitoring event when starting or ending of a data flow transmission is detected; and the processor 704 reports the data flow transmission event to the PCRF when detecting that the data flow transmission starts; or reports the data flow transmission end event to the PCRF when detecting that the data flow transmission ends so that the PCRF may determine to establish or terminate an Sd session according to a service data flow status.

Corresponding to implementation of the extended solution involving providing data flow monitoring and reporting for the PCRF in the embodiment in FIG. 3, the Gateway in this embodiment needs to have corresponding functions, and that the processor 704 reports the data flow transmission event to the PCRF when detecting that the data flow transmission starts; or reports the data flow transmission end event to the PCRF when detecting that the data flow transmission ends further includes: when detecting that the data flow transmission starts, the processor 704 suspends data transmission and buffers received data using the memory 701, reports the data flow transmission event to the PCRF, and resumes the data transmission after receiving an event response message returned by the PCRF.

Corresponding to implementation of the extended solution involving sharing the charging session for the one or more IP-CAN bearers in the embodiment in FIG. 3, the Gateway in this embodiment needs to have corresponding functions: if one IP-CAN session includes one or more IP-CAN bearers, and the one or more IP-CAN bearers use the charging session established for the first IP-CAN bearer, the Gateway further includes: the processor 704 terminates the charging session when detecting that no data flow is transmitted on the one or more IP-CAN bearers within the time threshold.

Corresponding to implementation of the extended solution involving sharing the charging session for the one or more IP-CAN bearers in the embodiment in FIG. 3, the Gateway in this embodiment needs to have corresponding functions: the processor 704 receives, using the signaling transceiver 703, quotas that are allocated for different rating groups RGs in the IP-CAN Session and that are delivered by the charging system; and the processor 704 uses a quota for flows that correspond to an RG and that are in the same IP-CAN Session; and the processor 704 collects data flow information on different IP-CAN Bearers, and separately reports the collected data flow information when a reporting condition is met, where the data flow information includes QoS information of the IP-CAN Bearers so that the charging system charges the data flows according to the QoS information.

Corresponding to implementation of the extended solution involving sharing the charging session for the one or more IP-CAN bearers in the embodiment in FIG. 3, when the charging system is the OFCS, the Gateway in this embodiment needs to have corresponding functions: the processor 704 collects data flow information that is on different IP-CAN Bearers and that corresponds to a same RG, or a same RG+ServiceID, or a same RG+SponsorID, and separately reports the collected data flow information when a reporting condition is met, where the data flow information includes the QoS information of the IP-CAN Bearers, and the ServiceID is a service identity corresponding to the data flow.

As shown in FIG. 11, FIG. 11 is a schematic structural diagram of a Gateway for implementing a charging session management method according to an embodiment of the present disclosure, and the Gateway includes: a processor 804, a data transceiver 802, a signaling transceiver 803, and a memory 801.

The memory 801 is configured to store code and a time threshold that are for the Gateway to perform an operation.

The data transceiver 802 is configured to complete transmission of a data flow to UE, and is further configured to transmit the data flow to another node on a network.

The signaling transceiver 803 is configured to complete transmission of content of a charging session to a charging system, and is further configured to complete transmission of a charging and control policy to a PCRF.

The processor 804 is configured to read data from the memory 801 and complete the following functions based on the data transceiver 802 and the signaling transceiver 803: the data transceiver 802 receives an IP-CAN bearer establishment request sent by the UE; the processor 804 establishes an IP-CAN bearer with the UE using the data transceiver 802, and monitors data flow transmission on the IP-CAN bearer; and the processor 804 establishes the charging session between the signaling transceiver 803 and the charging system when detecting that a data flow transmission starts to be transmitted on the IP-CAN bearer related to the UE.

Corresponding to implementation of the extended solution involving authentication for the UE in the embodiment in FIG. 4, when the IP-CAN bearer is to be established, the Gateway in this embodiment needs to have corresponding functions: after the data transceiver 802 receives the IP-CAN bearer establishment request from the UE, the processor 804 sends a charging and control policy request to the PCRF using the signaling transceiver 803; the signaling transceiver 803 receives a result that is of authentication performed by the OCS on the UE and that is carried in a charging and control policy response returned by the PCRF, where the authentication performed by the OCS on the UE is completed by means of a session channel between the PCRF and the OCS; and the processor 804 establishes the IP-CAN bearer using the data transceiver 802 when determining that the UE has been authenticated.

Corresponding to implementation of the extended solution in the embodiment in FIG. 4, where the extended solution involves that if one IP-CAN session includes one or more IP-CAN bearers, and that the one or more IP-CAN bearers use the charging session established for the first IP-CAN bearer, the Gateway in this embodiment needs to have corresponding functions: the processor 804 terminates the charging session when detecting that no data flow is transmitted on the one or more IP-CAN bearers within the time threshold.

Corresponding to implementation of the extended solution in the embodiment in FIG. 4, where the extended solution involves that if one IP-CAN session includes one or more IP-CAN bearers, and that the one or more IP-CAN bearers use the charging session established for the first IP-CAN bearer, in a case in which the charging system is the OCS, the Gateway in this embodiment needs to have corresponding functions: the processor 804 receives, using the signaling transceiver 803, quotas that are allocated for different rating groups RGs in the IP-CAN Session and that are delivered by the charging system; and the processor 804 uses a quota for flows that correspond to an RG and that are on all IP-CAN Bearers in the same IP-CAN Session; and the processor 804 collects data flow information on different IP-CAN Bearers, and separately reports the collected data flow information when a reporting condition is met, where the data flow information includes QoS information of the IP-CAN Bearers so that the charging system charges the data flows according to the QoS information.

Corresponding to implementation of the extended solution in the embodiment in FIG. 4, where the extended solution involves that if one IP-CAN session includes one or more IP-CAN bearers, and that the one or more IP-CAN bearers use the charging session established for the first IP-CAN bearer, in a case in which the charging system is the OFCS, the Gateway in this embodiment needs to have corresponding functions: the processor 804 collects data flow information, on different IP-CAN Bearers, corresponding to a same RG, or a same RG+ServiceID, or a same RG+SponsorID, and separately reports the collected data flow information when a reporting condition is met, where the data flow information includes QoS information of the IP-CAN Bearers.

As shown in FIG. 12, FIG. 12 is a schematic structural diagram of a policy and charging rules function entity for implementing a charging session management method according to an embodiment of the present disclosure, and the policy and charging rules function entity includes: a processor 903, a signaling transceiver 902, and a memory 901.

The memory 901 is configured to store code for a Gateway to perform an operation.

The signaling transceiver 902 is configured to transmit signaling to a charging system, is further configured to transmit a charging and control policy to a PCEF, and is further configured to transmit content in an Sd session to a TDF.

The processor 903 is configured to read data from the memory 901 and perform the following functions based on the data transceiver and the signaling transceiver 902: if the Sd session is established between the signaling transceiver 902 and the TDF for the IP-CAN session, after receiving a data flow transmission end event reported by the PCEF and if determining that no data flow transmission event that is in the IP-CAN session and that is reported by the Gateway is received within a time threshold, the processor 903 terminates the Sd session established for the IP-CAN session; and when receiving, using the signaling transceiver 902, another data flow transmission event that is in the IP-CAN session and that is reported by the Gateway, the processor 903 establishes a new Sd session with the TDF for the IP-CAN session, so as to deliver a new application detection and control rule ADC rule.

Corresponding to implementation of the extended solution involving that the charging and control policy delivered by the PCRF carries the policy of data flow monitoring and reporting in the embodiment in FIG. 7, the Gateway in this embodiment needs to have corresponding functions: the processor 903 returns a charging and control policy response to the PCEF using the signaling transceiver 902, where the charging and control policy response carries a charging and control policy in which the PCEF is required to monitor and report a data flow status in the IP-CAN session; and when the signaling transceiver 902 receives a data flow transmission start event, in the IP-CAN session, monitored and reported by the PCEF, the processor 903 establishes the Sd session for the IP-CAN session using the signaling transceiver 902, and sends the application detection and control rule to the TDF using the Sd session.

Corresponding to implementation of the extended solution involving UE authentication in the embodiment in FIG. 7, the Gateway in this embodiment needs to have corresponding functions: the processor 903 initiates an Sy session establishment request if determining that an Sy session needs to be established with an OCS, where the session establishment request carries UE authentication information, so as to request the OCS to authenticate the UE; receives an authentication result returned by the OCS; and generates the charging and control policy according to the authentication result, where the charging and control policy includes the authentication result.

Corresponding to implementation of the extended solution involving UE authentication in the embodiment in FIG. 7, the Gateway in this embodiment needs to have corresponding functions: before the PCRF establishes the Sd session, the PCRF receives the policy and control request sent by the PCEF; the processor 903 generates the charging and control policy, where the charging and control policy includes charging session establishment delay instruction information, so as to instruct the Gateway to establish a charging session with the charging system when a service data flow transmission starts; and the processor 903 returns the charging and control policy to the PCEF using the signaling transceiver 902.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a Universal Serial bus (USB) flash drive, a removable hard disk, a Read-Only Memory (ROM), a Random Access Memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A charging session management method, wherein when a user equipment (UE) is accessing a network, an Internet Protocol (IP)-Connectivity Access Network (CAN) bearer exists between a Gateway and the UE, wherein the IP-CAN bearer is used to transmit a data flow of the UE, wherein a charging session for the IP-CAN bearer exists between the Gateway and a charging system, and wherein the method comprises:
   receiving a session termination request from the charging system;
   terminating, by the Gateway, the charging session, wherein the charging system starts timing when there is no quota occupied on the IP-CAN bearer, and wherein the charging system sends the session termination request to the Gateway when determining that no new quota request is received within the time threshold; and
   establishing, by the Gateway, a new charging session for the IP-CAN bearer when detecting that a data flow starts to be transmitted on the IP-CAN bearer.

2. The method according to claim 1, wherein when the Gateway is to establish a first IP-CAN bearer with the UE, the method further comprises:
   establishing, by the Gateway, the first IP-CAN bearer with the UE;
   monitoring a data flow transmission status on the first IP-CAN bearer; and establishing, by the Gateway, a charging session with the charging system for the first IP-CAN bearer when detecting that a data flow starts to be transmitted on the first IP-CAN bearer.

3. The method according to claim 2, wherein the charging system is an online charging system (OCS), wherein before monitoring the data flow transmission status on the first IP-CAN bearer, the method further comprises:

sending, by the Gateway, a charging and control policy request to a policy and charging rules function (PCRF) entity after receiving a request for establishing the first IP-CAN bearer from the UE;

receiving, by the Gateway, a charging and control policy response returned by the PCRF, wherein the response carries a result of authentication performed by the OCS on the UE, wherein the authentication performed by the OCS on the UE is completed by means of a session channel between the PCRF and the OCS, and wherein the first IP-CAN bearer is established by the Gateway according to the result of the authentication.

4. The method according to claim 1, wherein when one IP-CAN session comprises one or more IP-CAN bearers and when the one or more IP-CAN bearers use a charging session established for a first IP-CAN bearer, the method further comprises terminating, by the Gateway, the charging session when detecting that no data flow is transmitted on the one or more IP-CAN bearers within the time threshold.

5. The method according to claim 4, wherein the method further comprises:

receiving, by the Gateway, quotas that are allocated for different rating groups (RGs) in the IP-CAN Session and that are delivered by the charging system; and sharing, by the Gateway, a quota for data flows that correspond to an RG and that are in the same IP-CAN Session.

6. The method according to claim 4, wherein the method further comprises:

collecting, by the Gateway, data flow information on different IP-CAN Bearers; and separately reporting the collected data flow information when a reporting condition is met, and wherein the data flow information comprises quality of service (QoS) information of the IP-CAN Bearers so that the charging system charges the data flows according to the QoS information.

7. The method according to claim 1, wherein the method further comprises:

receiving, by the Gateway, an instruction delivered by the PCRF; and reporting, by the Gateway according to the instruction delivered by the PCRF, a data flow transmission start event to the PCRF when detecting that a data flow transmission starts; or reporting a data flow transmission end event to the PCRF when detecting that a data flow transmission ends so that the policy and charging rules function (PCRF) either determines to establish an Sd session with a traffic detection function unit (TDF) according to the data flow transmission start event, or terminates an Sd session according to the data flow transmission end event.

8. The method according to claim 7, wherein reporting, by the Gateway, a data flow transmission event to the PCRF when detecting that a data flow transmission starts or reporting a data flow transmission end event to the PCRF when detecting that a data flow transmission ends further comprises the Gateway suspending data transmission and buffers received data, reporting the data flow transmission event to the PCRF, and resuming the data transmission after receiving an event response message returned by the PCRF when the Gateway detects that the data flow transmission starts.

9. A Gateway for implementing a charging session management method, wherein the Gateway comprises:

a processor;

a data transceiver;

a signaling transceiver; and a memory, wherein the processor, the data transceiver, the signaling transceiver, and the memory interact with each other using a bus, wherein the memory is configured to store code and a time threshold used by the Gateway to perform an operation, wherein the data transceiver is configured to:

transmit a data flow to user equipment (UE); and transmit the data flow to another node on a network, wherein the signaling transceiver is configured to:

transmit content of a charging session to a charging system; and transmit a charging and control policy to a Policy and Charging Rules Function (PCRF), wherein an Internet Protocol (IP)-Connectivity Access Network (CAN) bearer between the Gateway and the UE exists, wherein the IP-CAN bearer is used to transmit the data flow of the UE, wherein a charging session for the IP-CAN bearer exists between the Gateway and a charging system, and wherein the processor is configured to read data from the memory and complete the following functions based on the data transceiver and the signaling transceiver:

the processor receives a session termination request from the charging system and terminates the charging session, wherein the charging system starts timing when there is no quota occupied on the IP-CAN bearer, and wherein the charging system sends the session termination request to the Gateway when determining that no new quota request is received within the time threshold; and the processor establishes a new charging session for the IP-CAN bearer when detecting that data flow transmission starts on the IP-CAN bearer.

10. The Gateway according to claim 9, wherein when the Gateway establishes a first IP-CAN bearer with the UE, the processor establishes the first IP-CAN bearer with the UE using the data transceiver, and monitors data flow transmission on the first IP-CAN bearer, and wherein the processor establishes the charging session with the charging system using the signaling transceiver only when detecting, using the data transceiver, that a data flow starts to be transmitted on the first IP-CAN bearer.

11. The Gateway according to claim 9, wherein when the first IP-CAN bearer is to be established and after the data transceiver receives a request for establishing the first IP-CAN bearer from the UE, the processor sends a charging and control policy request to the PCRF using the signaling transceiver, wherein the signaling transceiver receives a result that is of authentication performed by the charging system on the UE and that is carried in a charging and control policy response returned by the PCRF, wherein the authentication performed by the charging system on the UE is completed by means of a session channel between the PCRF and the charging system, and wherein the processor establishes the first IP-CAN bearer using the data transceiver when determining that the UE has been authenticated.

12. The Gateway according to claim 9, wherein when one IP-CAN session comprises one or more IP-CAN bearers and when the one or more IP-CAN bearers use a charging session established for a first IP-CAN bearer, the processor terminates the charging session when detecting that no data flow is transmitted on the one or more IP-CAN bearers within the time threshold.

13. The Gateway according to claim 12, wherein the processor receives, using the signaling transceiver, quotas that are allocated for different rating groups (RGs) in the IP-CAN Session and that are delivered by the OCS, and wherein the processor shares a quota for data flows that correspond to an RG and that are in the same IP-CAN Session.

14. The Gateway according to claim 13, wherein the processor collects data flow information on different IP-CAN Bearers, and separately reports the collected data flow information when a reporting condition is met, and wherein the data flow information comprises quality of service (QoS) information of the IP-CAN Bearers so that the OCS charges the data flows according to the QoS information.

15. The Gateway according to claim 9, further comprising:
the signaling transceiver receives an instruction delivered by the PCRF; and
the processor reports, according to the instruction, a data flow transmission event to the PCRF when detecting that a data flow transmission starts; or reports a data flow transmission end event to the PCRF when detecting that a data flow transmission ends.

16. The Gateway according to claim 15, wherein the processor reporting a data flow transmission event to the PCRF when detecting that a data flow transmission starts or reporting a data flow transmission end event to the PCRF when detecting that a data flow transmission ends further comprises: when detecting that the data flow transmission starts, the processor suspends data transmission and buffers received data using the memory, reports the data flow transmission event to the PCRF, and resumes the data transmission after receiving an event response message returned by the PCRF.

17. A Gateway for implementing a charging session management method, wherein the Gateway comprises:
a processor;
a data transceiver;
a signaling transceiver; and
a memory,
wherein the processor, the data transceiver, the signaling transceiver, and the memory interact with each other using a bus,
wherein the memory is configured to store code and a time threshold used by the Gateway to perform an operation;
wherein the data transceiver is configured to:
transmit a data flow to user equipment (UE); and
transmit the data flow to another node on a network,
wherein the signaling transceiver is configured to:
transmit content of a charging session to a charging system; and
transmit a charging and control policy to a Policy and Charging Rules Function (PCRF),
wherein the processor is configured to read data from the memory and complete the following functions based on the data transceiver and the signaling transceiver:

the data transceiver receives an internet protocol (IP)-Connectivity Access Network (CAN) bearer establishment request sent by the UE;
the processor establishes an IP-CAN bearer with the UE using the data transceiver, and monitors data flow transmission on the IP-CAN bearer; and
the processor establishes the charging session between the signaling transceiver and the charging system when detecting that a data flow starts to be transmitted on the IP-CAN bearer related to the UE,
wherein when one IP-CAN session comprises one or more IP-CAN bearers and the one or more IP-CAN bearers use a charging session established for a first IP-CAN bearer, the processor terminates the charging session when detecting that no data flow is transmitted on the one or more IP-CAN bearers within the time threshold,
wherein the processor is further configured to: receive quotas that are allocated for different rating groups (RGs) in the IP-CAN Session and that are delivered by the charging system; and the processor shares a quota for data flows that correspond to an RG and that are in the same IP-CAN Session, and
wherein the processor is further configured to:
collect data flow information on different IP-CAN Bearers; and
separately report the collected data flow information when a reporting condition is met, and
wherein the data flow information comprises quality of service (QoS) information of the IP-CAN Bearers so that the charging system charges the data flows according to the QoS information.

18. The Gateway according to claim 17, wherein when the IP-CAN bearer is to be established, the Gateway further comprises:
after the data transceiver receives the IP-CAN bearer establishment request from the UE, the processor sends a charging and control policy request to the PCRF using the signaling transceiver;
the signaling transceiver receives a result that is of authentication performed by the charging system on the UE and that is carried in a charging and control policy response returned by the PCRF, wherein the authentication performed by an online charging system (OCS) on the UE is completed by means of a session channel between the PCRF and the charging system; and
the processor establishes the IP-CAN bearer using the data transceiver when determining that the UE has been authenticated.

19. A Gateway for implementing a charging session management method, wherein the Gateway comprises:
a processor;
a data transceiver;
a signaling transceiver; and
a memory,
wherein the processor, the data transceiver, the signaling transceiver, and the memory communicate via a bus,
wherein the memory is configured to store code and a time threshold used by the Gateway to perform an operation,
wherein the data transceiver is configured to:
transmit a data flow to user equipment (UE); and
transmit the data flow to another node on a network,
wherein the signaling transceiver is configured to:
transmit content of a charging session to a charging system; and
transmit a charging and control policy to a Policy and Charging Rules Function (PCRF), and wherein the processor is configured to read data from the memory and complete the following functions based on the data transceiver and the signaling transceiver:

the processor terminates the charging session when determining that no data flow is transmitted on the internet protocol (IP)-Connectivity access network (CAN) bearer within the time threshold and when the charging session established for an IP-CAN bearer exists between the signaling transceiver and the charging system; and the processor establishes a new charging session for the IP-CAN bearer when detecting that data flow transmission starts on the IP-CAN bearer, wherein when one IP-CAN session comprises one or more IP-CAN bearers and when the one or more IP-CAN bearers use a charging session established for a first IP-CAN bearer, the processor terminates the charging session when detecting that no data flow is transmitted on the one or more IP-CAN bearers within the time threshold, wherein the processor receives, using the signaling transceiver, quotas that are allocated for different rating groups (RGs) in the IP-CAN Session and that are delivered by an online charging system (OCS), and wherein the processor shares a quota for data flows that correspond to an RG and that are in the same IP-CAN Session, and wherein the processor collects data flow information on different IP-CAN Bearers, and separately reports the collected data flow information when a reporting condition is met, and wherein the data flow information comprises quality of service (QoS) information of the IP-CAN Bearers so that the OCS charges the data flows according to the QoS information.

* * * * *